United States Patent
Dworatzek et al.

(10) Patent No.: US 7,442,222 B2
(45) Date of Patent: Oct. 28, 2008

(54) FILTER HOUSING COMPOSED OF FIRST AND SECOND RELEASABLY CONNECTED SECTIONS

(75) Inventors: Klemens Dworatzek, Edingen (DE); Ralf Bauder, Ketsch (DE)

(73) Assignee: Mann & Hummel GmbH, Ludwigsburg (DE)

( * ) Notice: Subject to any disclaimer, the term of this patent is extended or adjusted under 35 U.S.C. 154(b) by 353 days.

(21) Appl. No.: 11/284,889

(22) Filed: Nov. 23, 2005

(65) Prior Publication Data

US 2006/0121768 A1 Jun. 8, 2006

(30) Foreign Application Priority Data

Nov. 25, 2004 (DE) .................. 10 2004 000 056

(51) Int. Cl.
*B01D 46/00* (2006.01)
*B65D 41/06* (2006.01)

(52) U.S. Cl. ................ 55/503; 55/502; 55/504; 220/293; 220/300

(58) Field of Classification Search ............... 55/385.3, 55/498, 502, 503, 504, DIG. 31; 220/4.21, 220/4.24, 293, 298, 300
See application file for complete search history.

(56) References Cited

U.S. PATENT DOCUMENTS

| | | | |
|---|---|---|---|
| 4,215,790 A | | 8/1980 | Ribble et al. |
| 4,333,580 A | * | 6/1982 | Sweigart, Jr. ............... 220/4.13 |
| 4,959,506 A | * | 9/1990 | Petty et al. .................. 174/669 |
| 4,998,639 A | * | 3/1991 | Seizert et al. ............... 141/368 |
| 5,207,463 A | * | 5/1993 | Seizert et al. ............. 292/256.6 |
| 5,320,233 A | * | 6/1994 | Welch .......................... 215/252 |
| 5,443,175 A | * | 8/1995 | Kelly et al. .................. 220/298 |
| 5,529,201 A | * | 6/1996 | Tallent et al. ................ 220/298 |
| 5,755,842 A | * | 5/1998 | Patel et al. ..................... 55/330 |
| 5,800,581 A | * | 9/1998 | Gielink et al. .............. 55/385.3 |
| 6,039,778 A | * | 3/2000 | Coulonvaux .................. 55/498 |
| 6,051,042 A | * | 4/2000 | Coulonvaux .................. 55/498 |
| 6,139,607 A | * | 10/2000 | Coulonvaux .................. 95/273 |
| 6,299,661 B1 | | 10/2001 | Bloomer et al. |
| 6,334,887 B1 | * | 1/2002 | Coulonvaux .................. 95/273 |
| 6,402,798 B1 | * | 6/2002 | Kallsen et al. .............. 55/385.3 |
| 6,419,718 B1 | * | 7/2002 | Klug et al. ..................... 55/320 |
| 6,436,162 B1 | * | 8/2002 | Wake et al. .................... 55/498 |
| 2006/0011633 A1 | * | 1/2006 | Cook et al. .................. 220/298 |

FOREIGN PATENT DOCUMENTS

WO WO 99/14483 A1 3/1999

OTHER PUBLICATIONS

European Search Report dated Mar. 4, 2006 (Four (4) pages) Including English Translation of relevant portion.

\* cited by examiner

*Primary Examiner*—Duane Smith
*Assistant Examiner*—Robert A Clemente
(74) *Attorney, Agent, or Firm*—Crowell & Moring LLP

(57) ABSTRACT

A housing, particularly a filter housing, especially an air filter housing, including first and second housing sections which can be releasably connected by a relative rotational movement between the sections. Latching members corresponding to one another are disposed on each of the housing sections, such that a first number of latching members has means for securing the connection between the housing sections, and a second number of latching members has means for adjusting the torque required to unlock the housing sections and means for adjusting the torque required to lock the housing sections.

6 Claims, 2 Drawing Sheets

FILTER HOUSING COMPOSED OF FIRST AND SECOND RELEASABLY CONNECTED SECTIONS

BACKGROUND OF THE INVENTION

The present invention relates to a housing, particularly a filter housing, especially an air filter housing, comprising first and second housing sections which can be releasably connected by a relative rotational movement between the sections.

Hollow cylindrical air filter housings with bayonet locks are known in the art. Bayonet locks of this type typically have latching surfaces on one housing section and latching projections on the housing section to be connected thereto. To connect these two housing sections, the latching projections and the latching surfaces are arranged in pairs. Depending on the size and the diameter of the housing, it has been found that two to eight corresponding latching pairs are suitable. Depending on the shape of the housing, the latching pairs are arranged radially in series or opposite one another. In the interior of the housing, hollow cylindrical filter elements with radial flow or cylindrical filter elements with axial flow are normally used. When servicing is necessary, these elements must be replaced. The housings must therefore be separable in such a way that this replacement can be performed without any difficulty. Servicing is simple with the above-described bayonet lock and requires no tool.

Published international application no WO 99/14483 A1 discloses various embodiments of a bayonet lock for assembling hollow cylindrical air filter housing sections. In this case, a hollow cylindrical cover member is connected to a hollow cylindrical lower housing section via a bayonet lock. To this end, the cover member is provided with corresponding latching elements in the vicinity of the cylindrical connection opening along the interior lateral circumferential surface. The lower housing section, on the other hand, has the respective latching elements in the vicinity of the cylindrical connection opening along the exterior lateral circumferential surface. In one embodiment, the latching surfaces are L-shaped, such that one of the legs is arranged parallel to the rotational locking movement and the other leg is arranged perpendicular thereto. The corresponding latching projection on the other housing section is U-shaped. In another embodiment, the latching plane is P-shaped and the associated latching projection banana-shaped. The portion of the latching plane perpendicular to the rotational locking or unlocking movement acts as a limit stop in both the L-shaped and the P-shaped configurations. In both embodiments, the same latching pairs are always used. Each latching pair performs the function of adjusting the torque required for locking and unlocking, adjusting the securing force and adjusting the radial and axial play in the locked state.

Apart from the well-known advantages, such as low cost, simple handling and high integration, the state of the art described above also has some disadvantages. Particularly adjustment has to be rated as problematic in the prior art solution. In the above-described bayonet solutions, the parameters to be adjusted are combined in the respective latching pairs, so that modifying one function also modifies one or more other functions. The functions, in this case, are torque during locking, torque during unlocking, clamping force in the axial direction, clamping force in the radial direction, play in the axial direction and play in the radial direction. The drawback that modifying one function also modifies one or more other functions makes adjustment substantially more difficult, because not every desirable combination is possible and a compromise is always necessary.

SUMMARY OF THE INVENTION

Accordingly, it is an object of the present invention to provide an improved bayonet system for assembling two housing sections.

Another object of the invention is to provide a bayonet system for assembling two housing sections, which is both simple to handle and simple to adjust.

A further object of the invention is to provide a bayonet system for assembling two parts which is simple and cost effective to manufacture.

These and other objects are achieved in accordance with the present invention by providing a housing comprising first and second housing sections which can be releasably connected by a relative rotational movement between the two sections, wherein mutually corresponding latching members are disposed on each of the housing sections, and a first number of the latching members comprises means for securing the connection between the housing sections and a second number of the latching members comprises means for adjusting the torque required to unlock the housing and means for adjusting the torque required to lock the housing.

The invention thus relates to a housing, particularly a filter housing, preferably an air filter housing, which comprises at least a first and a second hollow cylindrical housing section which are releasably connectable by a relative rotational movement between the two sections, such that latching members corresponding to one another are disposed on each of the housing sections. A number of latching members is disposed along the outer circumference of the first housing section in the region of the junction of the two hollow cylindrical housing sections and a corresponding number of latching members is disposed along the inner circumference of the second housing section in the region of the junction. The first housing section has a slightly smaller diameter than the second housing section in the region of the junction, such that when the two housing sections are assembled, the second housing section can be pushed over the first housing section by a certain axial length. The first housing section has an axial limit stop for the second housing section, such that when the axial stop is reached and the two housing sections are then rotationally twisted relative to one another, a releasable connection is established via the latching members. The limit stop forms a counterbearing for the corresponding latching members. According to the invention, a first number of latching members has means for securing the connection between the housing sections, and a second number of latching members has means for adjusting the torque required to unlock and means for adjusting the torque required to lock the housing. Preferably, the means for securing the connection determine the clamping forces in axial direction, the axial play and the radial play while the means for adjusting the torque determine the torques required for unlocking and locking the connection and the clamping force in radial direction. The number of latching members must be determined as a function of the size and the diameter of the housing sections, so that the required forces and torques can be produced and are adapted to the material. This separation of different functions into two different configurations of latching members enables excellent adjustability of the system in contrast to bayonet locks of the prior art. Each of the following functions is separately adjustable:

torque during locking,
torque during unlocking, clamping force in axial direction,
clamping force in radial direction,
play in axial direction, and
play in radial direction.

Despite this excellent adjustability of the system, it can nevertheless be conveniently manufactured and there is no need to make allowances with regard to handling or robustness of the entire system. This is achieved by at least two different pairings of latching projections and latching surfaces, which are correspondingly disposed along the outside circumference and the inside circumference in the region of the junction of the two housing sections.

According to one advantageous embodiment of the invention the housing sections are produced in the original forming process, particularly by injection molding. As a result, the bayonet lock can be fabricated very cost-effectively. The lock can be reproduced directly in the two halves of the mold.

It is advantageous if the first number of latching members has mutually corresponding securing planes disposed parallel to the rotational twisting direction to take up the axial clamping force and determine the axial play. Furthermore, the first number of latching members has securing planes disposed perpendicular to the rotational twisting direction to determine the radial play. The effective length of the securing planes parallel to the rotational twisting direction depends on the maximum clamping force. The higher the maximum clamping force is, the longer should the effective length of the parallel planes be. The latching members of the first housing section and the latching members of the second housing section have mutually corresponding parallel planes, such that the end stop on the housing section acts as a counterbearing. The radial play can be adjusted by means of the securing planes perpendicular to the rotational twisting direction. During locking, in the end position, a latching meber of the one housing section is received by a perpendicular securing plane of the other housing section.

According to another advantageous embodiment of the invention, the second number of latching members has mutually corresponding planes parallel to the rotational twisting direction on the one hand and torque planes that are disposed at an acute angle to these planes on the other. By selecting the corresponding angles of the torque planes, the torque required to unlock the connection can be adjusted independently from the torque required to lock the connection. By varying the slope of the two torque planes, a higher or lower torque for unlocking or locking may be defined.

It is further advantageous if the locking means disposed on a first housing section have a tip on the side facing the opening of the housing section, which is oriented toward the opening. From this tip, contact surfaces slope on both sides of the tip toward the other end of the first housing section. The purpose of this is to enable the latching members of a second housing section to slide off the tips and/or the contact surfaces of the first housing section when they meet the latching members of the first housing section as the two housing sections are assembled. This has the advantage that, to lock them, the two housing sections can be inserted into one another in any position relative to one another. Either they are in a position in which the locking means pass one another without contact and then latch during twisting, or the latching members meet one another in the first step and, because of the tips and the contact surfaces connected therewith, simply slide easily off one another until they reach a position where the housing sections can be secured by twisting.

A first housing section required for the aforementioned housing has at least two identically configured first latching members in the region of the junction to the second housing section, such that the first latching members cooperate with corresponding second latching members of the second housing section. The latching members disposed on the first housing section are preferably spaced at equal distances around the circumference of the housing in the region of the junction and have all the same shape. If the housing sections differ in size, it is therefore useful to configure the first housing section as the larger of the two. If certain factors related to the connection of the housing sections should change because of changed requirements, e.g., holding forces, torque forces or play, it is easier to modify the mold for the smaller housing section, in this example the second housing section.

According to yet another advantageous embodiment of the first housing section, the identically configured first latching members have a plane substantially parallel to the twisting direction with a working surface which is oriented in the direction opposite the opening. Planes extending substantially perpendicular to the parallel plane and integrally connected therewith are arranged at the respective ends of the parallel plane. The free ends of these two perpendicular planes are oriented in the direction opposite the opening of the housing section. Thus, the parallel plane and the planes perpendicular thereto form an integral U-shape that is open on the inside. From an injection molding perspective, the U-shape is to avoid a material accumulation, which would occur if the contour were solid without a cavity inside the U. It is also feasible, however, to use a triangular shape with an interior cutout while maintaining the parallel plane, again to avoid a material accumulation. This embodiment would be more complex and costly, however, because it would require an additional gate in the mold.

The second housing section for a housing of the above-described type has at least two differently configured second latching members in the region of the junction to the first housing section, such that the second latching members of the one configuration assume securing functions in conjunction with the first latching members of the first housing section. The second latching members of the second configuration assume adjustment functions of the torque required for unlocking and locking in conjunction with the first latching members of the first housing section. It is clear that identically configured latching members of the first housing section together with at least two different configurations of latching members of the second housing section provide adjustability of the connecting system on the one hand and offer convenient and simple means of manufacture on the other. By separating the securing functions from the torque functions by means of different configurations of the latching members of the second housing section, it is possible to modify the individual functions without directly influencing the remaining functions.

According to yet another advantageous embodiment of the second housing section, a first configuration of the latching members of the housing has a securing plane parallel to the rotational twisting direction and oriented toward the side opposite the open side of the housing section with a working surface to take up the axial clamping force and to determine the axial play and, perpendicular thereto, a securing plane whose free end is oriented in the opposite direction of the opening of the housing section with a working surface to adjust the radial play and to act as an end stop during locking. The latching members has approximately the shape of a horizontal L, such that the longer side of the L is parallel to the twisting direction and the side perpendicular thereto is oriented in the direction opposite the opening of the housing section. The securing plane parallel to the twisting direction, with its working surface on the side opposite the housing opening, cooperates with a working surface of a likewise parallel securing plane of the latching members of the first housing section. The working surfaces mutually support one another, such that the counterbearing thereto is formed by the limit stop of the two housing sections in relation to one another. In contrast, the securing plane disposed perpendicular thereto forms an end stop with its working surface, such that the radial play can be adjusted by shifting the perpendicular securing plane.

It is advantageous if the second configuration latching members of the second housing section have torque planes disposed at an acute angle to the rotational twisting direction extending from a tip and have working surfaces on the side opposite the opening of the housing section. By selecting the respective angles to the plane parallel to the twisting plane, the torque for unlocking the connection can be adjusted independently from the torque for locking the connection. The angles determining the torque during locking are approximately between zero and sixty degrees, preferably between five and thirty degrees to the plane parallel to the twisting direction. The angles determining the torque for unlocking the connection range approximately from zero to eighty degrees, preferably zero to sixty degrees. The axial distance between the apex of the tip and the end point of the latching members of the first housing section in the locked state determines the clamping force of the connection in radial direction. Thus it is clear that the forces required to unlock or lock the connection can be very easily modified and adjusted by modifying the angle.

In yet another advantageous embodiment of the second housing section, the two configurations of the latching members formed on the second housing section have a tip on the side toward the opening of the housing section, which is oriented toward this opening. From this tip, contact surfaces slope on both sides of the tip toward the other end of the second housing section. When the two housing sections are assembled, this ensures that, if the latching members meet during assembly, the latching members of the first housing section slide off the tips and/or the striking surfaces of the second housing section as they meet the latching members of the second housing section and thus enable assembly. In other words, it is not necessary when assembling the two housing sections to find a specific position before being able to connect them. Rather, the two housing sections can be directly inserted into one another, and the latching members either slide directly past one another or, if they meet, the housing sections slide off one another because of the sloping of the contact surfaces and the tip, such that assembly of the two housing sections is possible at any time.

These and other features of preferred further embodiments of the invention are described in the claims as well as in the specification and the drawings, and the individual features thereof may be implemented in embodiments of the invention or in other fields of use either alone or in subcombinations and may represent advantageous, separately protectable embodiments, for which protection is hereby claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
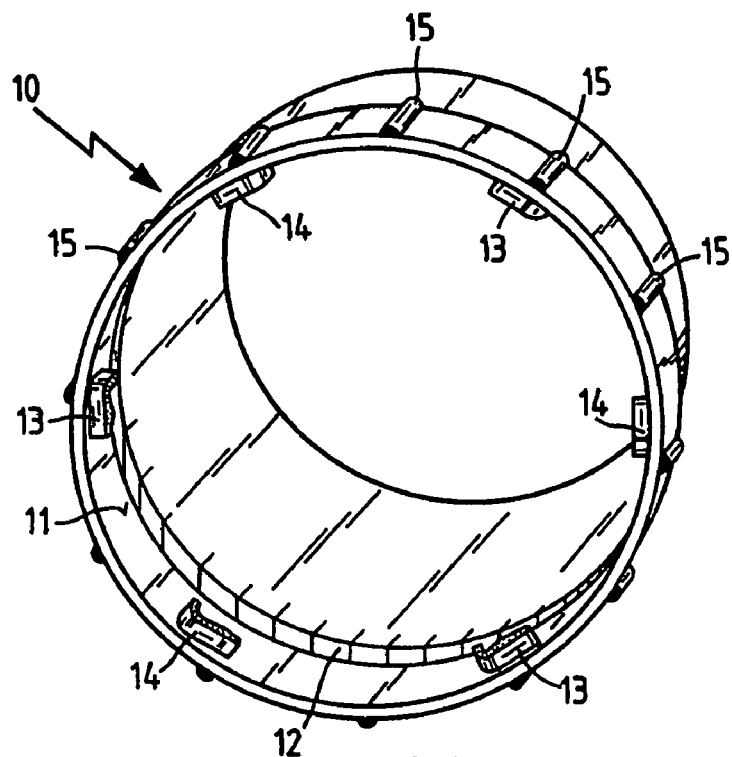
FIG. 1 is a schematic view of a first housing section constructed in accordance with the present invention.

FIG. 1 shows a cup-shaped first housing section 10, which essentially comprises a hollow cylinder having a cylindrical opening. In the vicinity of the opening, an interior circumferential surface 11 is formed in the first housing section 10 by a shoulder 12. In the area of the shoulder 12, the diameter of the first housing section 10 jumps to a larger diameter in the vicinity of the opening. Along the interior circumferential surface 11, two different configurations of latching members 13 and 14 are spaced at regular intervals. The outer lateral surface of the first housing section 10 is provided with gripping ribs 15 adjacent the opening to facilitate handling of the first housing section. The first housing section is produced in an original forming process, especially by injection molding.

Figure 2:
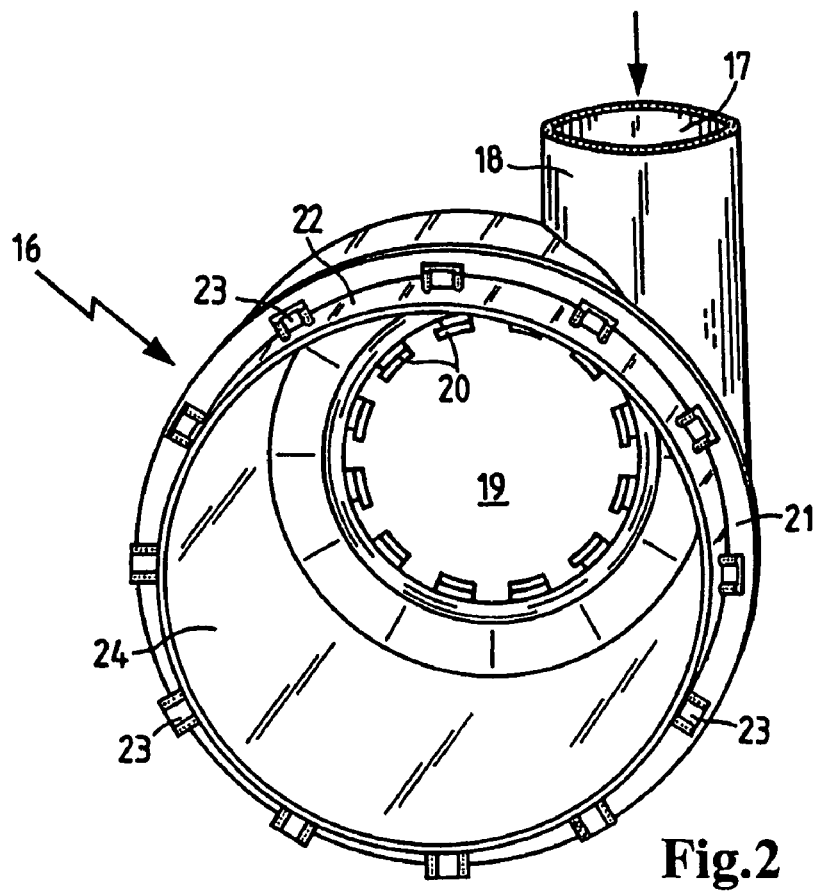
FIG. 2 is a schematic view of a second housing section constructed according to the invention.

FIG. 2 shows a second, likewise substantially cup-shaped cylindrical housing section 16 with an inlet 17, which is formed by a connecting piece 18 arranged tangentially at one end of the second housing section 16. At the same end of the second housing section 16, an outlet 19 is disposed concentric with the axial end face of the second housing section 16. The outlet 19 has clip projections 20 to sealingly receive an outlet connecting piece (not shown). At the opposite side of the second housing section 16, a stop collar 21 produces an abrupt change in diameter such that the diameter of the housing in the vicinity of an opening 24 opposite the outlet 19 is smaller than the housing diameter on the side opposite the opening 24. Between the stop collar 21 and the opening 24, an outer lateral surface 22 is formed, on which latching projections 23 are spaced at intervals corresponding to those of the latching members 13 and 14 of FIG. 1. During assembly of the housing sections 10 and 16, the outer rim of the first housing section 10 engages the stop collar 21 of the second housing section 16 and, by a relative twisting movement between the first housing section 10 and the second housing section 16, the two housing sections 10, 16 can be releasably interconnected via the latching members 13, 14 and 23.

Figure 3:
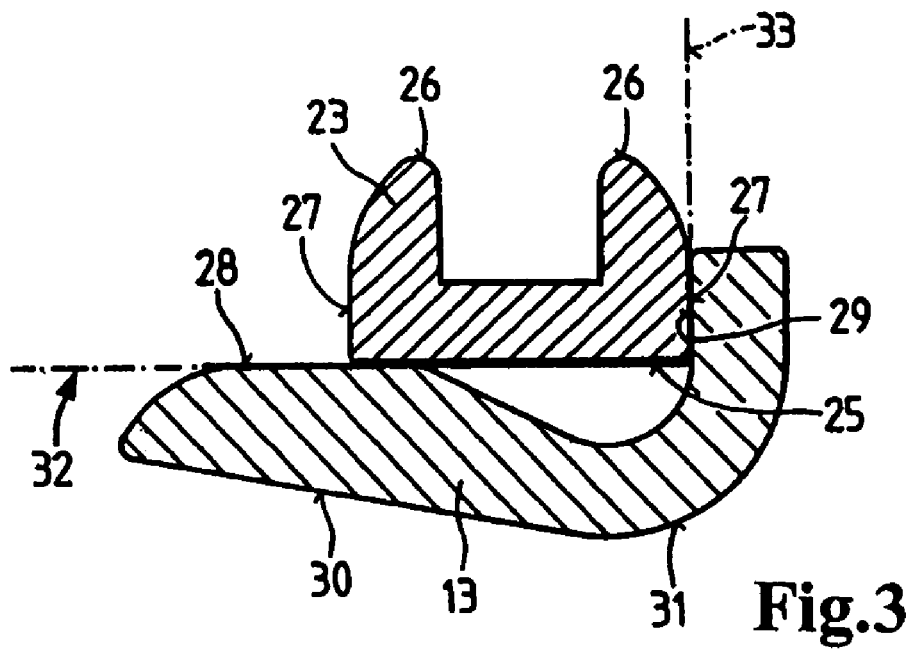
FIG. 3 is a schematic sectional representation of a first embodiment comprised of a latching surface and latching projections.

FIG. 3 shows a first configuration of the latching member 13 and the latching projection 23 in the locked state of the two housing sections 10, 16. The latching projection 23 has a working surface 25 that is parallel to the twisting direction of the two housing sections 10 and 16 and two tips 26 that are connected with the working surface 25 via surfaces 27. The shape of the latching projections 23 resembles an open U. This shape was selected to avoid a material accumulation. Other shapes are feasible, but the working surface 25 and the surfaces 27 disposed perpendicular thereto must be maintained. The latching projections 23 arranged in the second housing section 16 are positioned in such a way that the opening of the U is oriented toward the opening 24. The first configuration of the latching plane 13 of the first housing section 10 also has a working surface 28, which like the working surface 25 of the latching projection 23 is disposed parallel to the twisting direction of the two housing sections 10, 16 in relation to one another. Together with the flat working surface 28, a working surface 29 perpendicular thereto is provided, which corresponds to one of the surfaces 27 of the latching projection 23 and thus forms a radial limit stop. The latching member 13 further has a contact surface 30 oriented at an angle to the working surface 28, which at its highest points ends in a tip 31. The entire shape of the latching plane 13 resembles approximately a horizontal L, such that the working surface 28 and the short leg of the L are oriented toward the locked first housing section 10. When the two housing sections 10 and 16 are assembled, the latching projection 23 and the first latching member 13 contact each other along a securing plane 32 and a radial terminal plane 33. The securing plane 32 determines the clamping forces in axial direction and the axial play, while the radial terminal plane 33 determines the radial play. By modifying the height of the securing plane 32 relative to the stop collar 21 of the second housing section 16, the clamping force is increased in axial direction and the axial play is extended, for example. If the clamping force is increased, it is useful to increase the working surface 28 of the latching plane 13 in order to obtain a larger contact zone between the latching projection 23 and the latching member 13.

Figure 4:
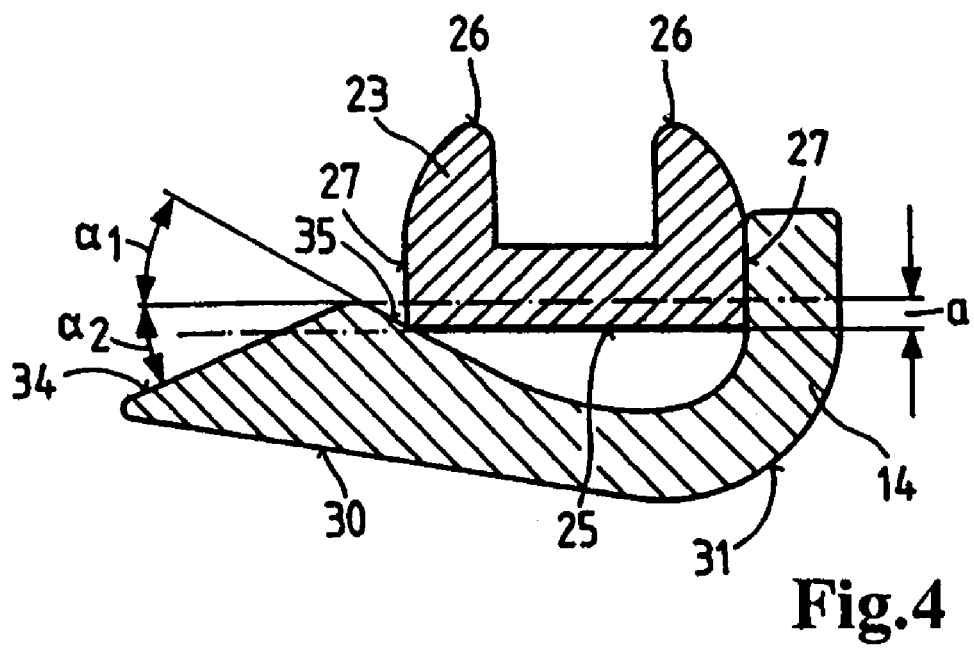
FIG. 4 is a schematic sectional representation of the connection between the latching projections and the latching surface of a second embodiment of the invention.

FIG. 4 illustrates the combination of the second configuration of the latching member 14 and the latching projection 23. Components corresponding to the previous figures are identified by the same reference numbers. The second latching member 14 has a working surface 34 disposed at an angle α2 to the twisting plane, which determines the torque required to lock the connection, and an additional working surface 35 disposed at an angle α1 to the twisting plane, which determines the torque required to unlock the connection. The difference in height (a) between the intersection of the working surfaces 34 and 35 and the working surface 25 of the latching projection 23 determines the clamping force of the connection in the radial direction. The torque required for unlocking can be modified by varying the angle α1. This angle can be between zero and eighty degrees, but is preferably between ten and sixty degrees. The angle α2 determines the torque required for locking the connection. This angle is between zero and sixty degrees, and is preferably between five and thirty degrees. Before the housing sections 10 and 16 can be secured relative to one another by a twisting movement, the two housing sections 10 and 16 must first be axially inserted into one another. It is possible, on the one hand, that the latching projections 23 of the second housing section 16 and the latching members 13 and 14 of the first housing section 10 are not located above one another and the two housing sections 10, 16 can be axially assembled until the stop collar 21 is reached. Thereafter, the bayonet joint can be locked with a relative rotational movement between the sections. On the other hand, if the latching projections 23 and the latching surfaces 13, 14 are located directly above one another in the axial assembly process, the tips 26 of the latching projection 23 engage either the tips 31 or the contact surfaces 30 of the latching surfaces 13, 14. Because the contact surface 30 is constructed at an angle to the twisting direction, the latching projections 23 automatically slide off the latching members 13 and 14 until the first housing section 10 engages the stop collar 21 of the second housing section 16. The subsequent assembly process is similar to the above-described locking process of the housing sections 10 and 16. It is clear, therefore, that by separating the securing function from the torque function by using different configurations of the latching members, it is possible to individually adjust functional parameters without influencing the remaining functional parameters. In this manner, the bayonet lock of the housing can be specifically adapted to the given requirements and remains nevertheless cost-effective and convenient to manufacture.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A housing comprising first and second housing sections which can be releasably connected by a relative rotational movement between the two sections, wherein mutually corresponding latching members are disposed on each of the housing sections, and a first number of the latching members comprises means for securing the connection between the housing sections and a second number of the latching members comprises means for adjusting the torque required to unlock the housing and means for adjusting the torque required to lock the housing; and wherein the second number of latching members comprises securing surfaces which correspond to one another and are disposed parallel to the rotational twisting direction and torque surfaces which are disposed at an acute angle to the securing surfaces such that, by the selection of the respective angles, the torque required to unlock the connection between the sections can be adjusted independently of the torque required to lock the connection.

2. A housing comprising first and second housing sections which can be releasably connected by a relative rotational movement between the two sections. wherein each of said housing sections has an open side defining an opening facing the other housing section;
wherein mutually corresponding latching members are disposed on each of the housing sections, and a first number of the latching members comprises means for securing the connection between the housing sections and a second number of the latching members comprises means for adjusting the torque required to unlock the housing and means for adjusting the torque required to lock the housing; and
wherein the latching members disposed on the first housing section have a tip on the side of the opening of the first housing section oriented toward the opening and contact surfaces on both sides of the tip which slope away from the opening, such that when the latching members of the second housing section engage the latching members of the first housing section during assembly of the two housing sections, the latching members of the second housing section slide off the tips or contact surfaces of the latching members of the first housing section to facilitate assembly of the sections.

3. A second housing section for a housing comprising first and second housing sections which can be releasably connected by a relative rotational movement between the two sections, wherein mutually corresponding latching members are disposed on each of the housing sections, and a first number of the latching members comprises means for securing the connection between the housing sections and a second number of the latching members comprises means for adjusting the torque required to unlock the housing and means for adjusting the torque required to lock the housing;
wherein at least two differently configured second latching members are disposed on said second housing section in the vicinity of the connection to the first housing section, such that the second latching members having one configuration assume a securing function in conjunction with the first latching members on the first housing section, and the second latching members having the other configuration assume torque adjusting functions for unlocking and locking the connection in conjunction with the first latching members on the first housing section.

4. A second housing section according to claim 3, wherein each of said first and second housing sections has an open side defining an opening facing the other housing section, and wherein the second latching members having the one configuration have a securing plane parallel to the rotational twisting direction and oriented toward the side opposite the open side with a working surface to take up the axial clamping force and determine the axial play, and a securing plane disposed perpendicular thereto, oriented with a free end in the direction opposite the opening of the housing section, which has a working surface for adjusting the radial play and serves as an end stop during locking.

5. A second housing section according to claim 3, wherein each of said first and second housing sections has an open side defining an opening facing the other housing section, and wherein the second latching members having the other configuration have torque planes extending from a tip which are at an acute angle to the rotational twisting direction and which have working surfaces on the side opposite the opening of the housing section, such that, by selection of the respective angles to the plane parallel to the twisting plane, the torque required to unlock the connection can be adjusted independently of the torque required to lock the connection.

6. A second housing section according to claim 3, wherein each of said first and second housing sections has an open side defining an opening facing the other housing section, and wherein both configurations of second latching members disposed on the second housing section have a tip on the side of the opening of the housing section oriented toward that opening from which contact surfaces on both sides of the tip slope toward the other end of the second housing section, such that, during assembly of the two housing sections, the latching members of the first housing section, as they engage the latching members of the second housing section, slide off the tips or striking surfaces of the latching members of the second housing section to facilitate assembly of the sections.

* * * * *